(12) United States Patent
Shin et al.

(10) Patent No.: US 8,437,398 B2
(45) Date of Patent: May 7, 2013

(54) METHOD AND APPARATUS FOR ADAPTIVELY CONVERTING FRAME RATE BASED ON MOTION VECTOR, AND DISPLAY DEVICE WITH ADAPTIVE FRAME RATE CONVERSION FUNCTION

(75) Inventors: Dong-hyuk Shin, Anyang-si (KR); Seung-hoon Han, Seoul (KR); Dae-hyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1610 days.

(21) Appl. No.: 11/869,094

(22) Filed: Oct. 9, 2007

(65) Prior Publication Data
US 2008/0239143 A1 Oct. 2, 2008

(30) Foreign Application Priority Data
Mar. 27, 2007 (KR) ........................ 10-2007-0030051

(51) Int. Cl.
*H04N 19/00684* (2006.01)
(52) U.S. Cl.
USPC .................................................... 375/240.16
(58) Field of Classification Search ........................ None
See application file for complete search history.

(56) References Cited

U.S. PATENT DOCUMENTS

| | | | | |
|---|---|---|---|---|
| 6,058,212 A * | 5/2000 | Yokoyama | ..................... | 382/236 |
| 7,075,988 B2 * | 7/2006 | Lee et al. | ....................... | 348/459 |
| 7,852,938 B2 * | 12/2010 | Shi et al. | ................... | 375/240.16 |
| 2006/0280249 A1 | 12/2006 | Poon | | |
| 2009/0122188 A1 * | 5/2009 | Hanaoka et al. | .............. | 348/459 |

FOREIGN PATENT DOCUMENTS

| KR | 1020040058391 A | 12/2002 |
|---|---|---|
| KR | 1020050076943 A | 7/2005 |

OTHER PUBLICATIONS

Communication dated Oct. 12, 2011 from the Korean Intellectual Property Office in counterpart Korean application No. 10-2007-0030051.

* cited by examiner

*Primary Examiner* — Nhon Diep
(74) *Attorney, Agent, or Firm* — Sughrue Mion, PLLC (57) ABSTRACT

An interpolation image generation method and apparatus for adaptively converting a frame rate based on a motion vector, and a display device having an adaptive frame rate conversion function are provided. The interpolation image generation method includes an interpolation image generation process calculating motion vectors from a previous image unit and a subsequent image unit that are continuous and generating an interpolation image using the motion vectors; a motion error boundary detection process detecting an area, in which a motion error determined from the motion vectors is greater than a predetermined value, as a boundary area of the interpolation image; and a motion compensation process compensating for a motion error inside the detected boundary area based on a dominant direction of the motion vectors using at least one of the previous image unit and the subsequent image unit.

24 Claims, 7 Drawing Sheets

METHOD AND APPARATUS FOR ADAPTIVELY CONVERTING FRAME RATE BASED ON MOTION VECTOR, AND DISPLAY DEVICE WITH ADAPTIVE FRAME RATE CONVERSION FUNCTION

CROSS-REFERENCE TO RELATED PATENT APPLICATION

This application claims priority from Korean Patent Application No. 10-2007-0030051, filed on Mar. 27, 2007 in the Korean Intellectual Property Office, the disclosure of which is incorporated herein in its entirety by reference.

BACKGROUND OF THE INVENTION

1. Field of the Invention

The present invention relates to an image display device, and more particularly, to a method and apparatus for adaptively converting a frame rate based on a motion vector, and a display device with an adaptive frame rate conversion function.

2. Description of the Related Art

Television (TV) signals received using an interface method have a 60-Hz frame rate in National Television Standards Committee (NTSC) systems, and a 50-Hz frame rate in Phase Alternating Line (PAL) systems. However, since TV signals are received at 24 Hz in terms of movies, a movie frame rate is converted generally using 3:2 or 2:2 pull-down, and the frames are displayed. This image conversion technology is called a Frame Rate Conversion (FRC) method.

Figure 1A:
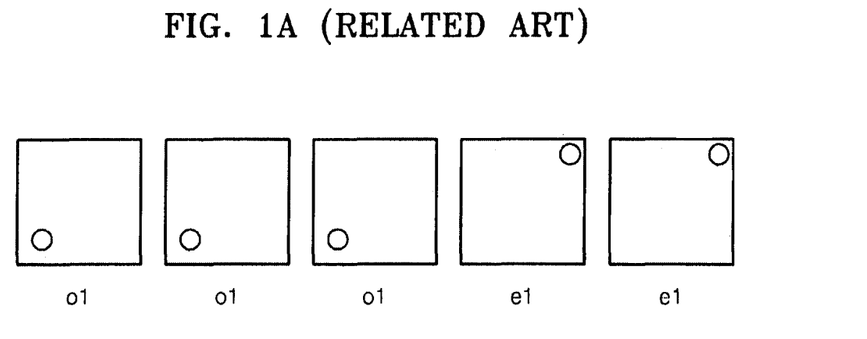
FIGS. 1A and 1B are diagrams for describing a related art FRC method.
Figure 1B:
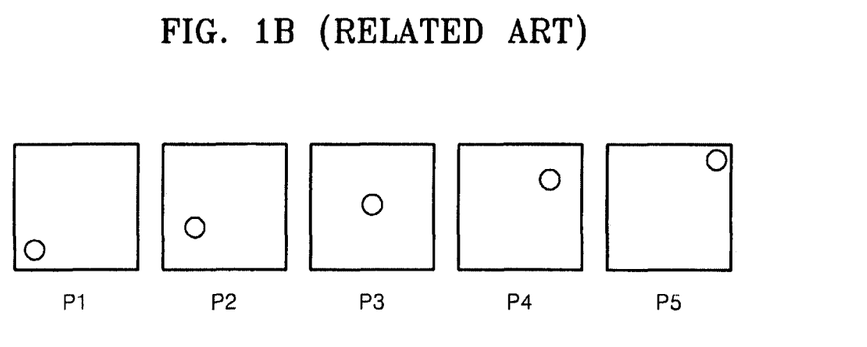

FIGS. 1A and 1B are diagrams for describing a related art FRC method.

FIG. 1A illustrates frames o1 having one odd field and frames e1 having one even field. In frames o1, a ball is located in the lower left corner, and in frames e1, the ball is located in the upper right corner. FIG. 1B illustrates a result obtained by applying 3:2 or 2:2 pull-down to the frames o1 and e1. Five frames P1 through P1 illustrated in FIG. 1B are implemented using the two image signals of the frames o1 and e1 illustrated in FIG. 1A. In this process, if an image signal having a 24-Hz frame rate is received, a first frame is displayed twice or three times, and a second frame is displayed twice, the two image signals are not continuous as illustrated in FIG. 1A. Thus, for the related art FRC method, it is required to generate continuous frames P2 through P4 using the two image signals of the frames o1 and e1. The technology of generating intermediate frames using two discontinuous image signals is called frame interpolation technology.

According to the related art FRC method, interpolation images are generated by weighting and adding the two frames o1 and e1. In order to generate the interpolation images, a display device obtains a motion vector corresponding to a dominant motion of an interpolation image and extracts a dominant movement direction from the motion vector. A weight used to generate another interpolation image is changed based on the dominant movement direction.

In all display devices up-converting a frame rate using a motion prediction and motion compensation method, artifacts due to a motion compensation error are generated in an edge portion of each image. These artifacts are caused by a motion error of an uncovered area, which is generated in a previous frame or field or a subsequent frame or field. In addition, if a local motion occurs inside a boundary of a panning image due to the movement of a camera or an image in which a dominant motion significantly occurs, an error occurs even in a compensated motion vector.

Figure 2:
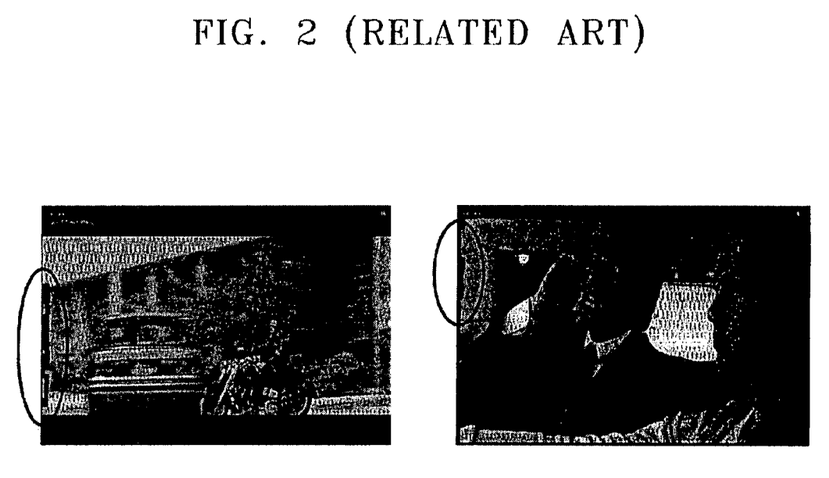
FIG. 2 illustrates artifacts generated when the related art FRC method is applied.

FIG. 2 illustrates artifacts generated when the related art FRC method is applied. The artifacts are generated in portions represented by dotted lines among the images illustrated in FIG. 2. Thus, related art display devices hide a portion in which an artifact is generated, by setting an active region. In this case, a viewer cannot help but view a screen that is a little bit smaller than an actual screen, and if a circumference portion of an image exists in the image, a motion compensation error still occurs.

Thus, an interpolation image generation method of canceling an artifact generated in an FRC process is required.

In addition, a display device for displaying a received image in its original size without setting an active region of the received image is required.

SUMMARY OF THE INVENTION

The present invention provides an interpolation image generation method for effectively detecting a motion error of a boundary area of an interpolation image and canceling a motion prediction error and a motion compensation error in the detected boundary area.

The present invention also provides an interpolation image generation apparatus for minimizing a motion prediction error and a motion compensation error generated in a boundary of an image having a large motion, when frames are interpolated using a motion prediction and motion compensation method.

The present invention also provides a display device for generating a correct interpolation image corresponding to a boundary of an image by increasing motion compensation accuracy by detecting in advance an area in which an error occurs from an image having a large motion and minimizing a motion prediction error.

According to an aspect of the present invention, there is provided a method of generating an interpolation image by interpolating at least one image unit of an input image, the method comprising: an interpolation image generation process, a motion error boundary detection process, and a motion compensation process. The interpolation image generation process may comprise calculating motion vectors from a previous image unit and a subsequent image unit that are continuous and generating the interpolation image using the motion vectors. The motion error boundary detection process may comprise detecting an area, in which a motion error determined from the motion vectors is greater than a predetermined value, as a boundary area of the interpolation image. The motion compensation process may comprise compensating for a motion error inside the detected boundary area based on a dominant direction of the motion vectors using at least one of the previous image unit and the subsequent image unit.

The motion error boundary detection process may comprise selecting a predetermined area in the interpolation image; accumulating a motion error in the selected area in horizontal and vertical directions; detecting a section, in which the accumulated motion error is greater than a predetermined error threshold, as a portion of the boundary area; and detecting a section, which is point symmetric to the detected boundary area on a central point of the interpolation image, as a portion of the boundary area.

The selected area may comprise an edge of the interpolation image, and the motion vectors may comprise a local motion vector calculated with respect to a predetermined block of the interpolation image and a global motion vector calculated with respect to a block greater than the predetermined block.

The motion compensation process may comprise a motion vector re-setting process re-setting the motion vectors inside the detected boundary area using a local motion vector calculated with respect to a predetermined block of the interpolation image and a global motion vector calculated with respect to a block greater than the predetermined block; and an artifact canceling process generating the interpolation image by adaptively combining the previous image unit and the subsequent image unit according to the re-set motion vectors.

The artifact canceling process may comprise generating the interpolation image by selectively using only one of the previous image unit and the subsequent image unit and blurring an edge of the boundary area of the interpolation image.

According to another aspect of the present invention, there is provided an apparatus for generating an interpolation image by interpolating at least one image unit of an input image, the apparatus comprising: a motion predictor which calculates motion vectors from a previous image unit and a subsequent image unit that are continuous and generates the interpolation image using the motion vectors; a boundary detector which detects an area, in which a motion error determined from the motion vector is greater than a predetermined value, as a boundary area of the interpolation image; and a motion compensator which compensates for a motion error inside the detected boundary based on a dominant direction of the motion vectors using at least one of the previous image unit and the subsequent image unit.

The boundary detector may select a predetermined area in the interpolation image, accumulate a motion error in the selected area in horizontal and vertical directions, detect a section, in which a accumulated motion error is greater than a predetermined error threshold, as a portion of the boundary area, and detect a section, which is point symmetric to the detected boundary area on a central point of the interpolation image, as a portion of the boundary area.

The boundary detector may select the area so as to comprise an edge of the interpolation image, calculate a local motion vector with respect to a predetermined block of the interpolation image, and calculate a global motion vector with respect to a block greater than the predetermined block.

The motion compensator may comprise: a motion vector re-setting unit which re-sets the motion vectors inside the detected boundary using a local motion vector calculated with respect to a predetermined block of the interpolation image and a global motion vector calculated with respect to a block greater than the predetermined block; and an artifact canceler which generates the interpolation image by adaptively combining the previous image unit and the subsequent image unit according to the re-set motion vectors.

The artifact canceler may generate the interpolation image by selectively using only one of the previous image unit and the subsequent image unit and comprise an edge blurring unit which blurs an edge of the boundary area of the interpolation image.

According to another aspect of the present invention, there is provided a display device which displays an input image by converting a frame rate of the input image, the display device comprising: an image receiver which receives the input image comprising at least one frame; a motion predictor which calculates motion vectors from a previous frame and a subsequent frame that are continuous and generates an interpolation image using the motion vectors; a boundary detector which detects an area, in which a motion error determined from the motion vectors is greater than a predetermined value, as a boundary of the interpolation image; a motion compensator which compensates for a motion error inside the detected boundary area based on a dominant direction of the motion vectors using at least one of the previous frame and the subsequent frame; and a display unit which displays the interpolation image.

Accordingly, artifacts generated in a boundary of an interpolation image can be minimized, and an input image can be displayed without reducing the size of the input image.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 3:
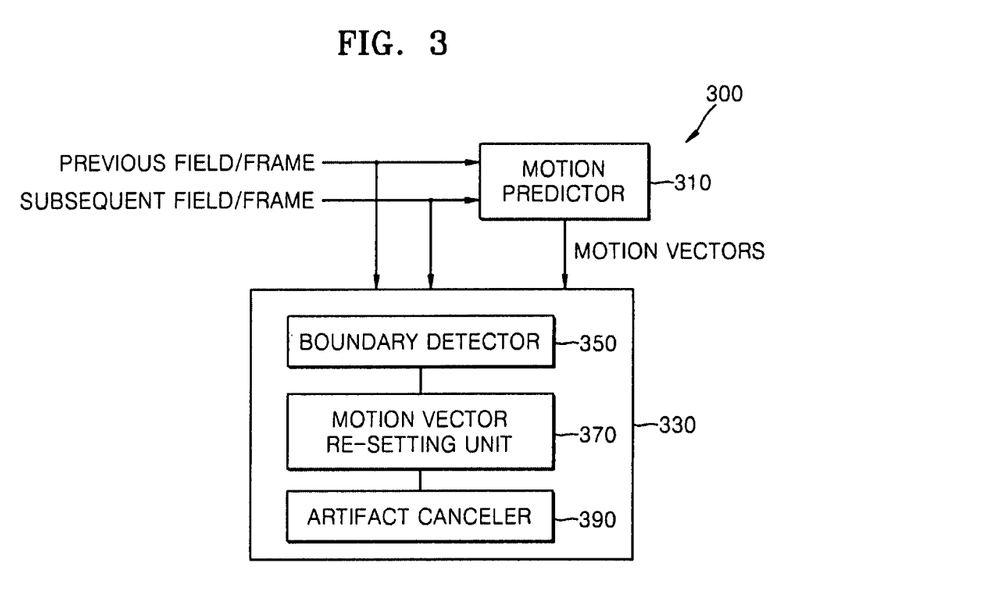
FIG. 3 is a block diagram of an interpolation image generation apparatus according to an exemplary embodiment of the present invention.

FIG. 3 is a block diagram of an interpolation image generation apparatus according to an exemplary embodiment of the present invention.

Referring to FIG. 3, an interpolation image generation apparatus 300 includes a motion predictor 310 and a motion compensator 330.

The motion predictor 310 receives an image unit of an input image. The image unit is a fundamental unit of an image signal, for example, a field or frame of the image signal. As illustrated in FIG. 3, the motion predictor 310 receives a previous image unit and a subsequent image unit, and calculates a motion vector from the previous image unit and the subsequent image unit. The motion vector is transmitted to the motion compensator 330.

The motion compensator 330 receives the previous image unit and the subsequent image unit, and receives the motion vector from the motion predictor 310. The motion compensator 330 includes a boundary detector 350, a motion vector re-setting unit 370, and an artifact canceler 390.

The boundary detector 350 calculates a motion error from the motion vector and detects a section, in which the motion error is large, as a boundary. In order to calculate the motion error, all kinds of conventional technologies can be used. For example, by applying a Sum of Absolute Differences (SAD) or Mean Absolute Difference (MAD) technique widely used in a digital motion prediction scheme, a motion vector difference value between blocks of an input image signal is obtained, and an absolute value of the obtained difference value can be acquired. A section in which the absolute value significantly varies can be detected as a boundary of an image.

Figure 4:
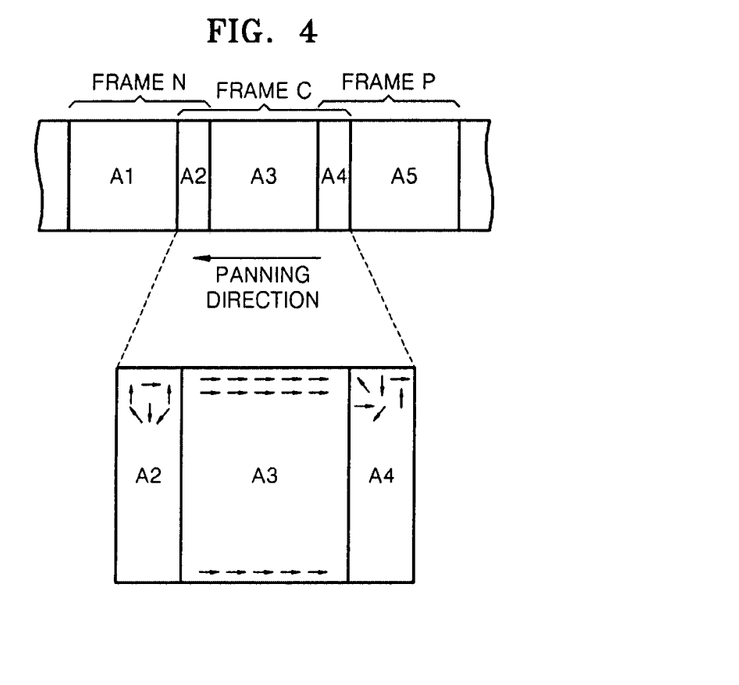
FIG. 4 is a diagram for describing an operation of a boundary detector of the interpolation image generation apparatus illustrated in FIG. 3.

FIG. 4 is a diagram for describing an operation of the boundary detector 350 of the interpolation image generation apparatus 300 illustrated in FIG. 3.

FIG. 4 shows a correlation among a previous frame (a frame P), a current frame (a frame C), and a subsequent frame (a frame N), when a camera is panned. Area A1 is an area existing only in the frame N, and area A2 is an area overlapping between the frame N and the frame C. Likewise, area A3 is an area existing only in the frame C, and area A4 is an area overlapping between the frame C and the frame P. Area A5 is an area existing only in the frame P. Since the camera is panned to the left direction, a motion vector orientates to the right direction. Thus, all motion vectors in the area A3 orientate in the right direction. However, since motion vectors in the areas A2 and A4 do not have a dominant direction, a motion error becomes larger. Thus, the boundary detector 350 can detect the areas A2 and A4 as boundaries.

In calculating the motion error, various methods, such as SAD, MAD, and Mean Square Difference (MSD) calculation methods, can be used to detect boundaries. However, the present invention is not limited to these methods. In order to simplify the specification, detailed descriptions of the boundary detection methods are omitted.

In this case, if a portion of the boundaries of an interpolation image is detected, the other portion of the boundaries can be easily detected using the point symmetry of a boundary.

Figure 5:
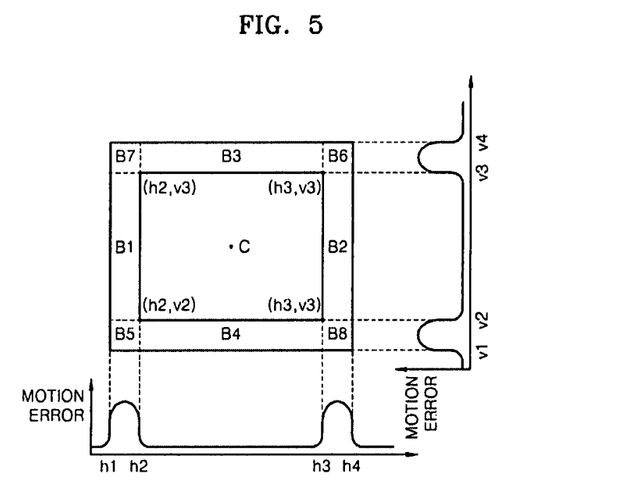
FIG. 5 is a diagram for describing an operation of detecting a boundary using a central point of an image in the boundary detector of the interpolation image generation apparatus illustrated in FIG. 3.

FIG. 5 is a diagram for describing an operation of detecting a boundary using a central point of an interpolation image in the boundary detector 350 of the interpolation image generation apparatus 300 illustrated in FIG. 3.

Referring to FIG. 5, the interpolation image has boundaries symmetric to a central point C. For convenience of description, graphs shown below and in the right side of the interpolation image illustrate motion errors obtained in the horizontal and vertical directions, respectively.

Considering the motion error in the horizontal direction, along the horizontal axis of the graph, the motion error significantly increases in a section between h1 and h2, decreases in a section between h2 and h3, and significantly increases in a section between h3 and h4. In addition, considering the motion error in the vertical direction, along the vertical axis of the graph, the motion error significantly increases in a section between v1 and v2, decreases in a section between v2 and v3, and significantly increases in a section between v3 and v4. Thus, sections in which the motion error significantly increases can be detected as boundaries.

Meanwhile, for example, if it is assumed that area B1 is detected as a boundary when the camera is panned, area B2 symmetric to the area B1 is also detected as a boundary. Likewise, when the camera is panned upwards, if area B3 is detected as a boundary, area B4 symmetric to the area B3 is also detected as a boundary. Likewise, if the camera is panned in the left and downward direction, area B5 and area B6 are detected as boundaries by being symmetric to each other. Likewise, if the camera is panned in the right and downward direction, area B7 and area B8 are detected as boundaries by being symmetric to each other.

Thus, the boundary detector 350 does not have to detect boundaries with respect to all areas of the interpolation image, and if boundaries are detected with respect to only an arbitrary half of the entire area, the boundary detector 350 can detect boundaries with respect to the other areas. Thus, an image processing amount is reduced, and therefore, high-speed image processing is possible.

Referring back to FIG. 3, the motion vector re-setting unit 370 re-sets motion vectors by replacing motion vectors in the detected boundaries with a global motion vector.

Figure 6:
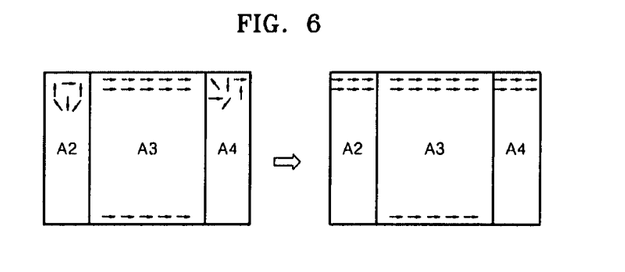
FIG. 6 is a diagram for describing an operation of a motion vector re-setting unit of the interpolation image generation apparatus illustrated in FIG. 3.

FIG. 6 is a diagram for describing an operation of the motion vector re-setting unit 370 of the interpolation image generation apparatus 300 illustrated in FIG. 3.

A frame shown in the left side of FIG. 6 is the same as the frame C illustrated in FIG. 4. As illustrated in FIG. 6, the frame C includes the areas A2 and A4 corresponding to boundaries and the area A3 that is a non-boundary area. In this case, since the global motion vector is a motion vector orienting to the right, the motion vectors in the boundaries are replaced with the global motion vector. A frame shown in the right side of FIG. 6 is a result of the replacement. The global motion vector used by the motion vector re-setting unit 370 to re-set motion vectors indicates a dominant direction or consistency of motion vectors of a current image frame. For example, if a camera is panned in a certain direction, the global motion vector constantly appears in an opposite direction to that in which the camera moves. However, if a change occurs in an image frame while panning a camera, in a current image frame, motion vectors exist in an opposite direction to that in which the camera moves, and motion vectors having small directivity also exist. In this case, a dominant direction of the current image frame can be determined using a global motion vector. In order to calculate the global motion vector, a method of obtaining a mean value of motion vectors around a unit block in the current image frame, a method of obtaining a median value of motion vectors around a unit block in the current image frame, or a method of obtaining a mean value of motion vectors in a predetermined area can be applied. However, the present invention is not limited thereto. Thus, all conventional methods of calculating a global motion vector having dominant directivity in both a previous image frame and a subsequent image frame can be applied to the present invention.

Referring back to FIG. 3, the artifact canceler 390 receives a result without the motion error from the motion vector re-setting unit 370 and cancels artifacts of the interpolation image. In order to cancel the artifacts of the interpolation image, the following Equation 1 can be used.

$$C = *\overset{\sim}{\phantom{x}}\overset{\sim}{\phantom{x}} + (1-a)*P \qquad (1)$$

In Equation 1, C, N, and P respectively denote matrices constituted of pixels of a current frame, a subsequent frame, and a previous frame, respectively, and a denotes a real number equal to or greater than 0 and equal to or less than 1. That is, a is a weight used to determine which one of the frame N and the frame P contributes more to the constitution of the frame C.

The artifact canceler 390 included in the interpolation image generation apparatus 300 may obtain the frame C by combining the frame N and the frame P or by using only one of the frame N and the frame P. For example, in FIG. 6, the area A2 of the frame C exists only in the frame P, and the area A4 of the frame C exists only in the frame N. Thus, the frame C can be calculated using only the frame P or the frame N. i.e., only motion vectors re-set in the area A2 or A4. That is, when the area A2 is generated, a=1, and when the area A is generated, a=0. As described above, when a boundary area generated when a camera is panned is interpolated, artifacts in the boundary area can be canceled by selectively using only a frame having image information corresponding to the boundary area.

After canceling artifacts in the boundary area, a final image frame is generated by blurring an edge portion between the areas A2 and A3. Likewise, an edge portion between the areas A3 and A4 is also blurred.

A related art display device cannot display the generated areas A2 and A4 due to the existence of artifacts. However, the interpolation image generation apparatus 300 according to the exemplary embodiment of the present invention can display even the areas A2 and A4 since artifacts in a boundary area can be effectively canceled.

As described above, using the interpolation image generation apparatus 300 illustrated in FIG. 3, a motion error of an image signal can be adaptively compensated, and an input image can be displayed without reducing its size. In particular, even when the input image includes a caption area for processing subtitles, the interpolation image generation apparatus 300 according to the exemplary embodiment of the present invention can generate an interpolation image so that no artifact exists in the interpolation image.

Figure 7:
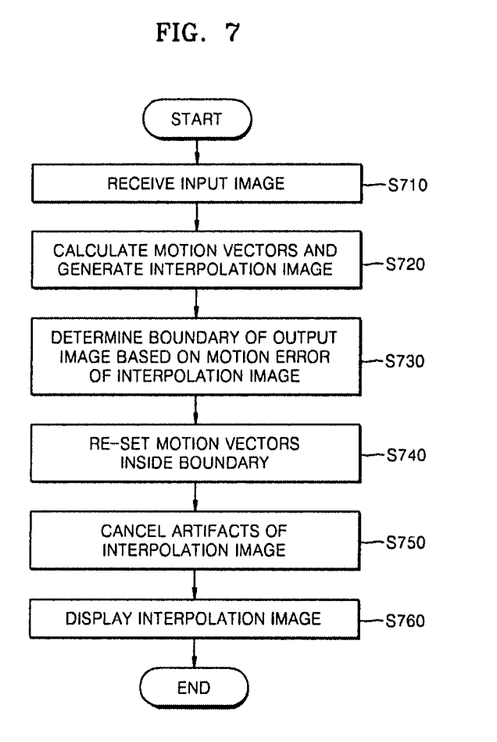
FIG. 7 is a flowchart of an interpolation image generation method according to an exemplary embodiment of the present invention.

FIG. 7 is a flowchart of an interpolation image generation method according to an exemplary embodiment of the present invention.

Referring to FIG. 7, an input image is received in operation S710. An interpolation image is generated by interpolating each image unit (i.e., a frame or field) of the input image in operation S720. As described above, the interpolation image is generated by calculating motion vectors from a previous image unit and a subsequent image unit that are continuous and using the calculated motion vectors.

An area, in which a motion error determined from the motion vectors of the interpolation image is greater than a predetermined value, is detected as a boundary area of the interpolation image in operation S730. This boundary detection process will be described in detail later with reference to FIG. 8.

Motion vectors inside the detected boundary area are re-set using a global motion vector in operation S740. As described above, the global motion vector is determined based on a dominant direction or consistency of the motion vectors inside the detected boundary area. According to the re-set motion vectors, artifacts of the interpolation image are canceled by using at least one of the previous image unit and the subsequent image unit in operation S750. As described above, in order to cancel the artifacts, only one of the previous image unit and the subsequent image unit may be selectively used. The boundary area of the interpolation image from which the artifacts are canceled is blurred, and the interpolation image is displayed in operation S760.

Figure 8:
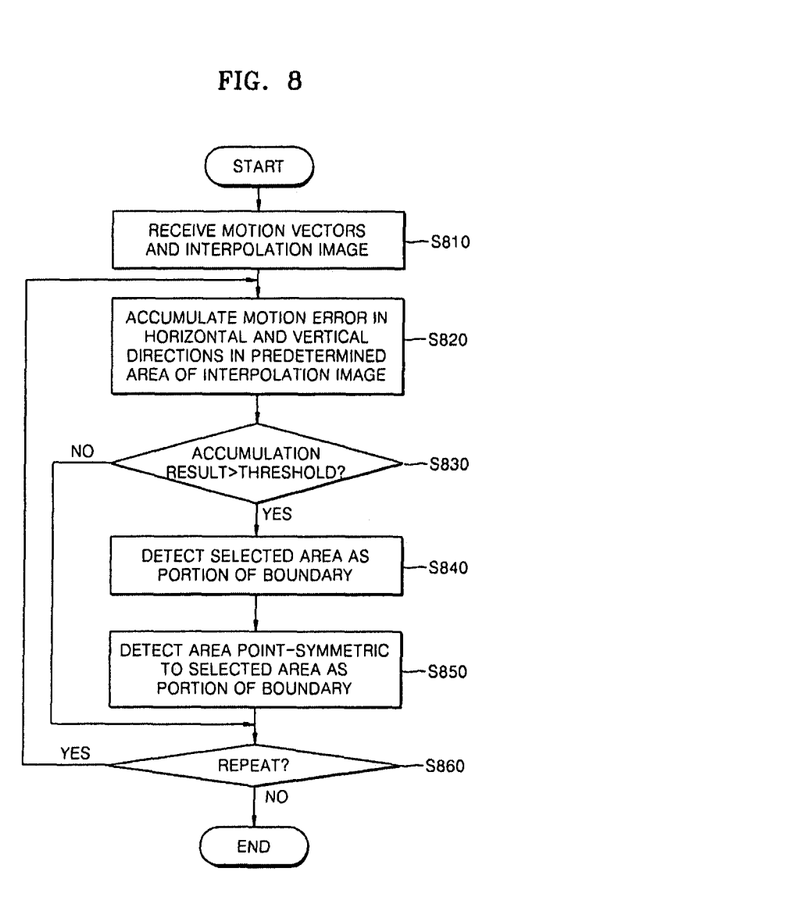
FIG. 8 is a flowchart of a boundary detection process of the interpolation image generation method illustrated in FIG. 7.

FIG. 8 is a flowchart of the boundary detection process (S730) of the interpolation image generation method illustrated in FIG. 7.

Referring to FIG. 8, motion vectors and an interpolation image are received in operation S810. A predetermined area (i.e., a block) of the interpolation image is selected, and a motion error in the selected area is accumulated in the horizontal and vertical directions in operation S820. As described above, in the motion error accumulation, the conventional motion error calculation methods, such as SAD, MAD, and MSD, can be used.

After calculating the accumulated motion error in a predetermined direction, it is determined whether the accumulated motion error is greater than a predetermined threshold in operation S830. If it is determined, in operation S830, that the accumulated motion error is greater than the predetermined threshold, a section corresponding to the accumulated motion error is detected as a portion of a boundary area of the interpolation image in operation S840. Using symmetry of the boundary area, a section, which is point symmetric to the detected boundary area on a central point of the interpolation image, is also detected as a portion of the boundary area in operation S850. Operations S820 through S850 can be repeated, if necessary (S860). As described above, according to the interpolation image generation method according to the exemplary embodiment of the present invention, a boundary area can be correctly detected while reducing an image processing load.

Figure 9:
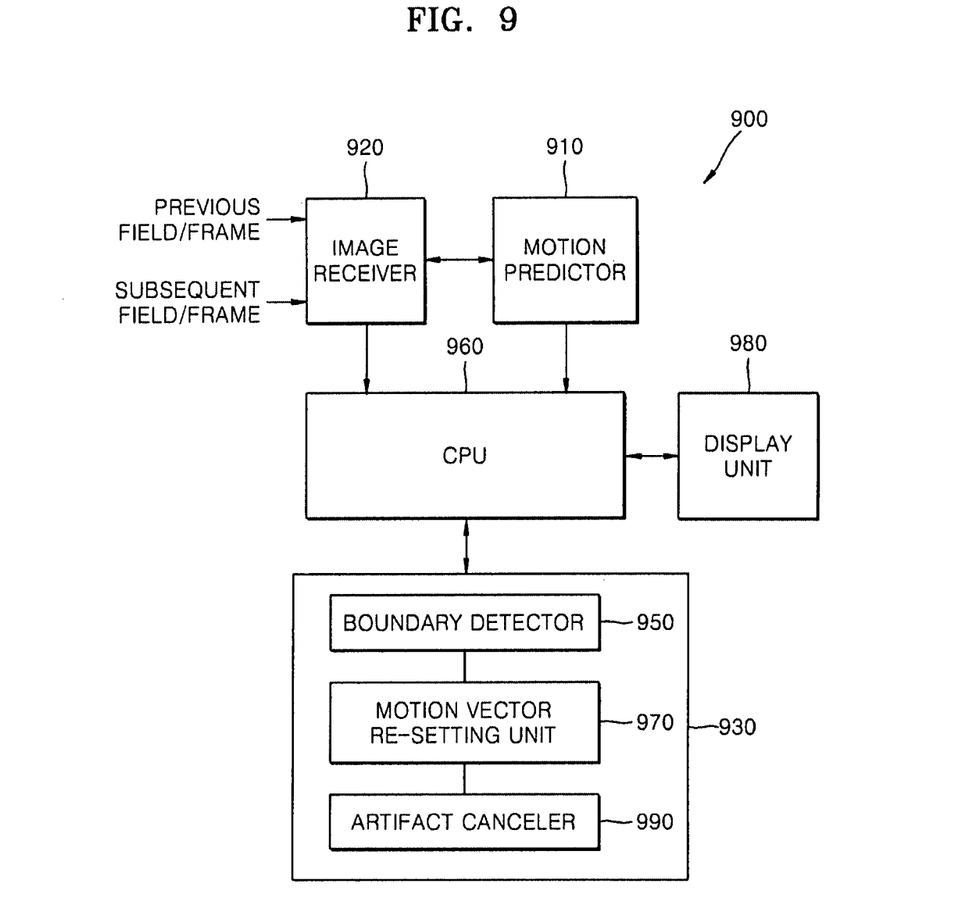
FIG. 9 is a block diagram of a display device having an adaptive FRC function according to an exemplary embodiment of the present invention.

FIG. 9 is a block diagram of a display device having an adaptive FRC function according to an exemplary embodiment of the present invention.

Referring to FIG. 9, a display device 900 having an adaptive FRC function includes an image receiver 920, a motion predictor 910, a central processing unit (CPU) 960, a motion compensator 930, and a display unit 980.

The image receiver 920 receives a previous image unit (i.e., a frame or field) and a subsequent image unit. The received image units are transmitted to the motion predictor 910, and the motion predictor 910 extracts motion vectors from the received image units. The image units and the motion vectors are transmitted to the CPU 960. The CPU 960 transmits the image units and the motion vectors to the motion compensator 930.

The motion compensator 930 includes a boundary detector 950, a motion vector re-setting unit 970, and an artifact canceler 990. Operations of the motion predictor 910, the motion compensator 930, the boundary detector 950, the motion vector re-setting unit 970, and the artifact canceler 990 illustrated in FIG. 9 are respectively similar to operations of the motion predictor 310, the motion compensator 330, the boundary detector 350, the motion vector re-setting unit 370, and the artifact canceler 390 illustrated in FIG. 3. Thus, in order to simply the specification, repeated descriptions thereof are omitted.

The CPU 960 receives an interpolation image output from the motion compensator 930 and controls the display unit 980 to display the interpolation image.

The display device 900 according to the exemplary embodiment of the present invention can effectively cancel artifacts in the interpolation image and display more than 95% of an input image.

While the present invention has been particularly shown and described with reference to exemplary embodiments thereof, it will be understood by those of ordinary skill in the art that various replacements, modifications and changes in form and details may be made therein without departing from the spirit and scope of the present invention as defined by the following claims. Therefore, it is to be appreciated that the above described exemplary embodiments are for purposes of illustration only and are not to be construed as limitations of the invention. For example, although the CPU 960 illustrated in FIG. 9 is shown as a device independent to the motion predictor 910 and the motion compensator 930, operations processed by the motion predictor 910 and the motion compensator 930 can be processed by the CPU 960. The interpolation image generation method according to the exemplary embodiment of the present invention can also be embodied as computer readable codes on a computer readable recording medium. The CPU 960 may read the computer readable codes from the computer readable recording medium and execute an operation according to the computer readable codes.

As described above, according to the exemplary embodiments of the present invention, artifacts can be canceled by detecting a motion vector error of a boundary area of an interpolation image and effectively compensating for a detected motion prediction error and a detected motion compensation error.

In addition, when frames are interpolated using a motion prediction and motion compensation method, a motion prediction error and a motion compensation error occurring in a boundary area of an image in which a motion is large can be minimized.

In addition, by increasing accuracy of motion compensation in an image in which a motion error is large, a correct interpolation image corresponding to a boundary area of an image can be generated, and the size of a displayed image can be extended to an original image size greater than an active region.

What is claimed is:

1. A method of generating an interpolation image by interpolating at least one image unit of an input image in an image display device, the method comprising:
    an interpolation image generation process, performed by a motion predictor of the image display device, calculating motion vectors from a previous image unit and a subsequent image unit that are continuous and generating the interpolation image using the motion vectors;
    a motion error boundary detection process, performed by a boundary detector of the image display device, detecting an area, in which a motion error determined from the motion vectors is greater than a predetermined value, as a boundary area of the interpolation image; and
    a motion compensation process, performed by a motion compensator of the image display device, compensating for a motion error inside the detected boundary area based on a dominant direction of the motion vectors using at least one of the previous image unit and the subsequent image unit.

2. The method of claim 1, wherein the motion error boundary detection process comprises:
    selecting a predetermined area in the interpolation image;
    accumulating a motion error in the selected area in horizontal and vertical directions;
    detecting a section, in which the accumulated motion error is greater than a predetermined error threshold, as a portion of the boundary area; and
    detecting a section, which is point symmetric to the detected boundary area on a central point of the interpolation image, as a portion of the boundary area.

3. The method of claim 2, wherein the selected area comprises an edge of the interpolation image.

4. The method of claim 2, wherein the motion vectors comprise a local motion vector calculated with respect to a predetermined block of the interpolation image and a global motion vector calculated with respect to a block greater than the predetermined block, and the motion error is calculated using at least one of a Sum of Absolute Differences, a Mean Absolute Difference, and a Mean Square Difference of the global and local motion vectors.

5. The method of claim 1, wherein the motion compensation process comprises:
    a motion vector re-setting process re-setting the motion vectors inside the detected boundary area using a local motion vector calculated with respect to a predetermined block of the interpolation image and a global motion vector calculated with respect to a block greater than the predetermined block; and
    an artifact canceling process generating the interpolation image by adaptively combining the previous image unit and the subsequent image unit according to the re-set motion vectors.

6. The method of claim 5, wherein the artifact canceling process comprises generating the interpolation image by selectively using only one of the previous image unit and the subsequent image unit.

7. The method of claim 6, wherein the artifact canceling process further comprises blurring an edge of the boundary area of the interpolation image.

8. The method of claim 1, wherein the image unit is a frame or a field of the input image received at a predetermined frame rate.

9. An apparatus for generating an interpolation image by interpolating at least one image unit of an input image, the apparatus comprising:
    a motion predictor which calculates motion vectors from a previous image unit and a subsequent image unit that are continuous and generates the interpolation image using the motion vectors;
    a boundary detector which detects an area, in which a motion error determined from the motion vector is greater than a predetermined value, as a boundary area of the interpolation image; and
    a motion compensator which compensates for a motion error inside the detected boundary based on a dominant direction of the motion vectors using at least one of the previous image unit and the subsequent image unit.

10. The apparatus of claim 9, wherein the boundary detector selects a predetermined area in the interpolation image, accumulates a motion error in the selected area in horizontal and vertical directions, detects a section, in which an accumulated motion error is greater than a predetermined error threshold, as a portion of the boundary area, and detects a section, which is point symmetric to the detected boundary area on a central point of the interpolation image, as a portion of the boundary area.

11. The apparatus of claim 10, wherein the selected area comprises an edge of the interpolation image.

12. The apparatus of claim 10, wherein the motion vectors comprise a local motion vector calculated with respect to a predetermined block of the interpolation image and a global motion vector calculated with respect to a block greater than the predetermined block, and the motion error is calculated using at least one of a Sum of Absolute Differences, a Mean Absolute Difference, and a Mean Square Difference of the global and local motion vectors.

13. The apparatus of claim 9, wherein the motion compensator comprises:
    a motion vector re-setting unit which re-sets the motion vectors inside the detected boundary using a local motion vector calculated with respect to a predetermined block of the interpolation image and a global motion vector calculated with respect to a block greater than the predetermined block; and
    an artifact canceler which generates the interpolation image by adaptively combining the previous image unit and the subsequent image unit according to the re-set motion vectors.

14. The apparatus of claim 13, wherein the artifact canceler generates the interpolation image by selectively using only one of the previous image unit and the subsequent image unit.

15. The apparatus of claim 14, wherein the artifact canceler comprises an edge blurring unit which blurs an edge of the boundary area of the interpolation image.

16. The apparatus of claim 9, wherein the image unit is a frame or a field of the input image received at a predetermined frame rate.

17. A display device which displays an input image by converting a frame rate of the input image, the display device comprising:
- an image receiver which receives the input image comprising at least one frame;
- a motion predictor which calculates motion vectors from a previous frame and a subsequent frame that are continuous and generates an interpolation image using the motion vectors;
- a boundary detector which detects an area, in which a motion error determined from the motion vectors is greater than a predetermined value, as a boundary of the interpolation image;
- a motion compensator which compensates for a motion error inside the detected boundary area based on a dominant direction of the motion vectors using at least one of the previous frame and the subsequent frame; and
- a display unit which displays the interpolation image.

18. The display device of claim 17, wherein the boundary detector selects a predetermined area in the interpolation image, accumulates a motion error in the selected area in horizontal and vertical directions, detects a section, in which an accumulated motion error is greater than a predetermined error threshold, as a portion of the boundary area, and detects a section, which is point symmetric to the detected boundary area on a central point of the interpolation image, as a portion of the boundary area.

19. The display device of claim 18, wherein the selected area comprises an edge of the interpolation image.

20. The display device of claim 19, wherein the motion vectors comprise a local motion vector calculated with respect to a predetermined block of the interpolation image and a global motion vector calculated with respect to a block greater than the predetermined block, and the motion error is calculated using at least one of a Sum of Absolute Differences, a Mean Absolute Difference, and a Mean Square Difference of the global and local motion vectors.

21. The display device of claim 17, wherein the motion compensator comprises:
- a motion vector re-setting unit which re-sets the motion vectors inside the detected boundary using a local motion vector calculated with respect to a predetermined block of the interpolation image and a global motion vector calculated with respect to a block greater than the predetermined block; and
- an artifact canceler which generates the interpolation image by adaptively combining the previous image unit and the subsequent image unit according to the re-set motion vectors.

22. The display device of claim 21, wherein the artifact canceler generates the interpolation image by selectively using only one of the previous image unit and the subsequent image unit.

23. The display device of claim 22, wherein the artifact canceler comprises an edge blurring unit which blurs an edge of the boundary area of the interpolation image.

24. A non-transitory computer readable recording medium storing a computer program for executing a method of generating an interpolation image by interpolating at least one image unit, the method comprising:
- an interpolation image generation process calculating motion vectors from a previous image unit and a subsequent image unit that are continuous and generating the interpolation image using the motion vectors;
- a motion error boundary detection process detecting an area, in which a motion error determined from the motion vectors is greater than a predetermined value, as a boundary area of the interpolation image; and
- a motion compensation process compensating for a motion error inside the detected boundary area based on a dominant direction of the motion vectors using at least one of the previous image unit and the subsequent image unit.

* * * * *